United States Patent
Gustafsson

(10) Patent No.: US 11,519,764 B2
(45) Date of Patent: Dec. 6, 2022

(54) ROTARY ENCODER AND METHOD FOR DETERMINING MALFUNCTION OF A ROTARY ENCODER

(71) Applicant: LEINE & LINDE AB, Stängnäs (SE)

(72) Inventor: Mats Gustafsson, Stallarholmen (SE)

(73) Assignee: LEINE & LINDE AB, Stängnäs (SE)

( * ) Notice: Subject to any disclaimer, the term of this patent is extended or adjusted under 35 U.S.C. 154(b) by 173 days.

(21) Appl. No.: 17/188,240

(22) Filed: Mar. 1, 2021

(65) Prior Publication Data

US 2021/0270644 A1    Sep. 2, 2021

(30) Foreign Application Priority Data

Mar. 2, 2020  (EP) ..................................... 20160455

(51) Int. Cl.
*G01D 18/00*   (2006.01)
*G01D 5/04*    (2006.01)
*G08B 21/18*   (2006.01)

(52) U.S. Cl.
CPC .............. *G01D 18/00* (2013.01); *G01D 5/04* (2013.01); *G08B 21/182* (2013.01)

(58) Field of Classification Search
None
See application file for complete search history.

(56) References Cited

U.S. PATENT DOCUMENTS

| | | | |
|---|---|---|---|
| 6,630,659 B1 * | 10/2003 | Stridsberg | G01D 5/3473 250/231.16 |
| 10,197,388 B2 | 2/2019 | Mayer et al. | |
| 2020/0012256 A1 | 1/2020 | Mitterreiter | |

FOREIGN PATENT DOCUMENTS

| | | |
|---|---|---|
| DE | 102010046251 A1 | 3/2012 |
| DE | 102012207656 A1 | 11/2013 |
| DE | 102018210989 A1 | 1/2020 |

* cited by examiner

*Primary Examiner* — Raul J Rios Russo
*Assistant Examiner* — Carl F. R. Tchatchouang
(74) *Attorney, Agent, or Firm* — Carter, DeLuca & Farrell LLP

(57) ABSTRACT

A rotary encoder includes a detection device for detecting malfunction of the rotary encoder, a rotor, a stator, a shaft having a bearing configuration, and an axial bushing internally connected to the bearing configuration and rotatably arranged in a housing of the rotary encoder. A spring device is arranged for pre-stressing the bushing and the bearing configuration. A distancing arrangement is arranged to change an axial distance between the rotor and the stator by rotation of the bushing resulting from malfunction of the bearing configuration and by creating increased distance between the rotor and stator. The increased distance is sufficient to reduce detectability of angular positions of the shaft, as detected by the rotary encoder, to a level below a predetermined threshold.

15 Claims, 5 Drawing Sheets

ROTARY ENCODER AND METHOD FOR DETERMINING MALFUNCTION OF A ROTARY ENCODER

CROSS-REFERENCE TO RELATED APPLICATIONS

The present application claims priority to Application No. 20160455.0, filed in the European Patent Office on Mar. 2, 2020, which is expressly incorporated herein in its entirety by reference thereto.

FIELD OF THE INVENTION

The present invention relates to a method for determining malfunction of a rotary encoder, the rotary encoder including a rotor, a stator, and a shaft having a bearing configuration. The present invention also relates to a computer program product including program code for a computer for implementing the method hereof. Moreover, the present invention relates to a rotary encoder and an assembly equipped with the rotary encoder.

BACKGROUND INFORMATION

Rotary encoders are used in industry for position and speed monitoring and are typically mounted on a shaft of a motor or a gearbox of an assembly. Rotary encoders may be equipped with a rotor unit and a stator unit for detecting operational parameters of the shaft of the assembly.

Rotary encoders are mounted on a rotary encoder shaft, and various bearings may be used for proper operation. In case bearings of the rotary encoder are blocked or get sluggish, a driving torque on the rotary encoder shaft is increased and may eventually lead to breakage of a connection between the rotary encoder shaft and the shaft of the assembly.

SUMMARY

Example embodiments of the present invention provide a rotary encoder, which mitigates, alleviates, and/or eliminates one or more of the above-identified deficiencies and disadvantages singly or in any combination.

Example embodiments of the present invention provide methods for determining malfunction of a rotary encoder, rotary encoders, and computer programs for determining malfunction of a rotary encoder, to, for example, permit more reliable and safe operation of a rotary encoder and achieve an automated and user-friendly detection of malfunctioning bearings of a rotary encoder.

According to an example embodiment of the present invention, a method for determining malfunction of a rotary encoder, having a rotor, a stator, and a shaft including a bearing configuration, includes: providing an axial bushing internally connected to the bearing configuration and rotatably arranged in a housing of the rotary encoder, the rotary encoder including a distancing arrangement being arranged to change an axial distance between the rotor and the stator; pre-stressing the bushing and the bearing configuration in a first axial direction by a spring member; and displacing the bushing and the bearing configuration together with the rotor in a second axial direction, opposite to the first axial direction, by rotation of the bushing resulting from malfunction of the bearing configuration and by creating increased distance between the rotor and stator caused by the distancing arrangement, which increased distance is sufficient to reduce detectability of angular positions of the shaft, as detected by the rotary encoder, to a level below a predetermined threshold.

The distancing arrangement may, for example, include a number of elongated members, such as pins, which are arranged in a respective recess during normal, non-malfunctioning, operation of the rotary encoder. The bushing may include at least one recess, each being arranged to receive a pin. The distancing arrangement may be any suitable device configured to increase a distance between the rotor and the stator in a malfunctioning state of operation of the rotary encoder.

Angular positions of the shaft correspond to angular positions of the rotor.

The reduced detectability of angular positions of the rotor/shaft, as detected by the rotary encoder, may relate to amplitude values of measurements of angular positions of the rotor/shaft. For example, it may be determined that a decreased detectability relating to angular positions of the rotor/shaft is at hand if at least a number of amplitude values of measurements of angular positions are below a predetermined threshold level during a predetermined time interval.

The reduced detectability of angular positions of the rotor/shaft, as detected by the rotary encoder, may relate to a detection frequency of angular positions of the rotor/shaft. For example, it may be determined that a decreased detectability relating to angular positions of the rotor/shaft is at hand if detection frequency of angular positions is below a predetermined threshold level during a predetermined time interval. In such a case, detection of angular positions of the rotor/shaft is not completely interrupted but a number of measurements during the predetermined time interval is not detected/registered accurately.

According to the measures described herein, safe and reliable operation of the rotary encoder may be obtained. For example, operation of an associated assembly may be interrupted before severe damage or wear of components of the assembly and/or the rotary encoder occur. Moreover, high standards of operation, involving a small number of unexpected disturbances, may be upheld.

The method may include displacing the bushing and the bearing configuration together with the rotor in the second axial direction a distance adapted to a detection method of the rotary encoder. Examples of such detection methods may involve capacitive, optical, inductive, and magnetic detection technologies. A versatile method is therefore provided. By displacing the bushing and the bearing configuration together with the rotor in the second axial direction on the basis of a detection method of the rotary encoder, a robust manner of signal interruption is achieved. Furthermore, a gap between the rotor and stator does not need to be greater than necessary, which may result in a compact configuration of the rotary encoder.

The method may include generating an alarm signal when a reduced detectability of angular positions of the shaft, as detected by the rotary encoder, to a level below a predetermined threshold is at hand. Therefore, an automated and user-friendly method is provided.

The method may automatically interrupting operation of an assembly connected to the rotary encoder when a reduced detectability of angular positions of the shaft, as detected by the rotary encoder, to a level below a predetermined threshold is at hand. Thus, an automated and user-friendly method is provided.

The method may include generating an alarm signal when an interrupted detection of angular positions of the shaft/rotor, as detected by the rotary encoder, is at hand. Therefore, an operator of the rotary encoder may be informed about the interrupted detection and take adequate measures, such as interrupting operation of an assembly that includes the rotary encoder.

The method may include automatically interrupting operation of an assembly connected to the rotary encoder when an interrupted detection of angular positions of the shaft/rotor, as detected by the rotary encoder, is at hand. Thus, a user-friendly method is provided. A controlled shut-down of the assembly may thus be achieved.

The method may include providing more than one recess to the bushing, each of the recesses being arranged to receive a respective pin. Therefore, a more balanced operation of the rotary encoder is achieved. By providing a plurality of recesses holding a respective pin symmetrically at the bushing, a reduced level of noise emissions is achieved. By providing a plurality of recesses holding a respective pin symmetrically at the bushing, a reduced level vibrations during operation of the encoder is achieved.

According to an example embodiment of the present invention, a rotary encoder includes a detection device for detecting malfunction of the rotary encoder, a rotor, a stator, and a shaft having a bearing configuration. The rotary encoder further includes: an axial bushing internally connected to the bearing configuration and rotatably arranged in a housing of the rotary encoder; a spring device being arranged for pre-stressing the bushing and the bearing configuration in a first axial direction; and a distancing arrangement being arranged to change an axial distance between the rotor the stator, the bushing and the bearing configuration together with the rotor being arranged to be displaced in a second axial direction, opposite to the first axial direction, by rotation of the bushing resulting from malfunction of the bearing configuration and by creating increased distance between the rotor and stator, which increased distance is sufficient to reduce detectability of angular positions of the shaft, as detected by the rotary encoder, to a level below a predetermined threshold.

The rotary encoder may include a displacement device for displacing the bushing and the bearing configuration together with the rotor in the second axial direction a distance adapted to a detection method of the rotary encoder. The distancing arrangement may include at least one recess and respective pins, and the pins may be brought out of position from the recesses when the bearing configuration is malfunctioning.

The rotary encoder may include: an alarm device adapted to generate an alarm signal when a reduced detectability of angular positions of the shaft, as detected by the rotary encoder, to a level below a predetermined threshold is at hand; and/or an interruption device adapted to automatically interrupt operation of an assembly connected to the rotary encoder when a reduced detectability of angular positions of the shaft, as detected by the rotary encoder, to a level below a predetermined threshold is at hand.

The rotary encoder may include: an alarm device adapted to generate an alarm signal when an interrupted detection of angular positions of the shaft/rotor, as detected by the rotary encoder, is at hand; and/or an interruption device adapted to automatically interrupt operation of an assembly connected to the rotary encoder when an interrupted detection of angular positions of the shaft/rotor, as detected by the rotary encoder, is at hand.

The alarm device and/or the interruption device may include an electronic control unit (ECU).

The bushing of the rotary encoder may include more than one recess, each of the recesses being arranged to receive a respective pin. For example, three to five recesses may be provided, each being associated with a pin. The pins may be arranged as a suitable elongated member. The pins may be formed of a metal or metal alloy. The pins may be formed, at least partly, of a plastic material or any suitable other material.

According to an example embodiment of the present invention, an assembly includes a rotary encoder as described herein. The assembly may be any device, system, installation, machine, platform, and/or configuration, in which the rotary encoder is applicable. The assembly may include an electric motor, a combustion engine, a transmission shaft configuration, etc.

According to an example embodiment of the present invention, a computer program product including instructions which, when the program is executed by a computer, cause the computer to carry out any one of the steps of the method described herein.

According to an example embodiment of the present invention, a non-transitory computer-readable storage medium stores instructions which, when executed by a computer, cause the computer to carry out any one of the steps of the method described herein.

According to an example embodiment of the present invention, a computer program product includes instructions which, when the program is executed by an electronic control arrangement, cause the electronic control arrangement to carry out any one of the steps of the method described herein.

According to an example embodiment the present invention, a non-transitory computer-readable storage medium stores instructions which, when executed by an electronic control arrangement, cause the electronic control arrangement to carry out any one of the steps of the method described herein.

According to an example embodiment of the present invention, a computer program for determining malfunction of a rotary encoder includes program code for causing an electronic control arrangement or a computer connected to the electronic control arrangement to perform any one of the method steps described herein, when executed by the electronic control arrangement or the computer.

According to an example embodiment of the present invention, a computer program for determining malfunction of a rotary encoder includes program code stored on a non-transitory computer-readable medium for causing an electronic control arrangement or a computer connected to the electronic control arrangement to perform any one of the method steps described herein.

According to an example embodiment of the present invention, a computer program for determining malfunction of a rotary encoder includes program code stored on a non-transitory computer-readable medium for causing an electronic control arrangement or a computer connected to the electronic control arrangement to perform any one of the method steps described herein, when executed by the electronic control arrangement or the computer.

According to an example embodiment of the present invention, a computer program product includes program code stored on a non-transitory computer-readable medium for performing any one of the method steps described herein, when the computer program is executed by an electronic control arrangement or a computer connected to the electronic control arrangement.

According to an example embodiment of the invention, a computer program product includes program code stored in a non-volatile manner on a non-transitory computer-readable medium for performing any one of the method steps described herein, when the computer program is executed by an electronic control arrangement or a computer connected to the electronic control arrangement.

Further features and aspects of example embodiments of the present invention are described in more detail below with reference to the appended schematic Figures, in which the same reference characters denote the same or similar components throughout the several views.

DETAILED DESCRIPTION

Figure 1:
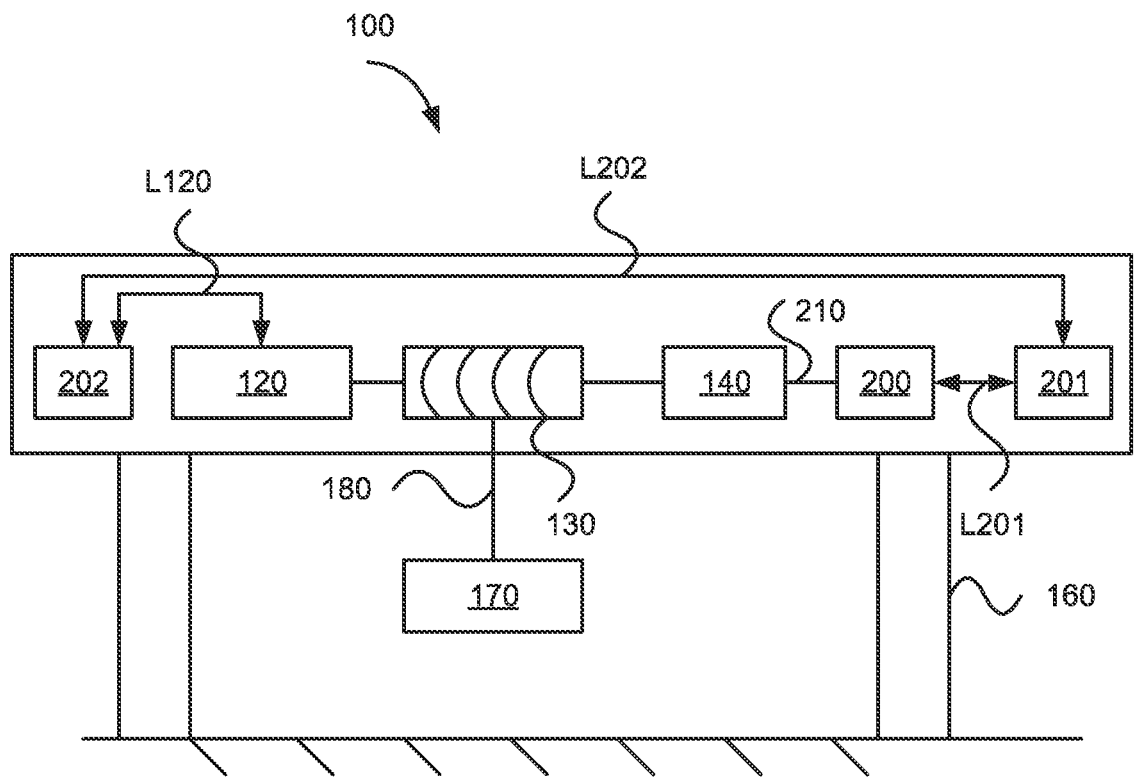
FIG. 1 schematically illustrates an assembly according to an example embodiment of the present invention.

FIG. 1 is a schematic side view of an assembly 100. The assembly 100 is arranged, for example, as a crane for movement of various goods. The assembly 100 includes a motor unit 120 arranged to control operation of a cylinder unit 130 for holding a crane wire 180. The cylinder unit 130 may alternatively be referred to as a drum. The crane wire 180 is adapted to detachably hold a load 170 at one end thereof. The crane may be provided with a number of support members 160. A first electronic control arrangement 201 is arranged for communication with a second electronic control arrangement 202 via a link L202. Alternatively, the first control arrangement 201 is arranged for communication directly with the motor unit 120. The second control arrangement 202 is arranged for communication with the motor unit 120 via a link L120. The first and/or second control arrangement may be arranged to control operation of the assembly 100, e.g., by controlling the motor unit 120. Thus, for example, rotational/lateral movement of the cylinder unit 130 may be controlled and the load 170 may be transported, positioned, and/or moved, in vertical and lateral directions, according to operator commando signals. Alternatively, operation of the cylinder unit 130 may be performed automatically and/or autonomously by the second control arrangement 202.

A shaft 210 of a rotary encoder 200 may be mechanically arranged via a clutch 140 to a shaft of the cylinder unit 130. The second control arrangement 202 may be arranged to control operation of the clutch 140. For example, the shaft 210 of the rotary encoder 200 is mechanically attached to the shaft of the cylinder unit 130 via a coupling. The coupling is arranged to connect the shaft 210 of the rotary encoder 200 and an external shaft, such as the shaft of the cylinder unit 130, as illustrated in greater detail with reference to FIG. 2. The first control arrangement 201 is arranged for communication with the rotary encoder via a link L201. The rotary encoder 200 is arranged to determine operational parameters of the assembly 100. The operational parameters may be, e.g., cylinder unit shaft rotational speed and/or relative rotational positions of the cylinder unit shaft.

The method and the rotary encoder described herein are applicable to paper mill systems and rolling mills, for example. The method and the rotary encoder described herein are also applicable to, for example, elevator systems, oil rig systems, and various machine tools. The rotary encoder may thus be applicable to a great variety of assemblies.

The method and rotary encoder are applicable to various assemblies that include an engine and/or motor for rotating a shaft. The assembly may be a vehicle, such as a mining machine, tractor, dumper, wheel-loader, forest machine, earth mover, road construction vehicle, road planner, emergency vehicle, tracked vehicle, etc. The method and the rotary encoder are suited to other applications that include a rotary shaft, e.g., watercraft. The watercraft may be of any kind, e.g., motorboats, steamers, ferries, ships, submarines, etc.

The method and rotary encoder described herein are applicable to various stationary assemblies and/or platforms that include a rotating shaft, such as windmills for generating electricity.

A number of rotary encoders 200 may be provided in the assembly 100 for detecting operational parameters of various components, units, and/or arrangements of the assembly 100. For example, the assembly may include two or more rotary encoders 200.

A link refers, for example, to a communication link, which may be a physical connection, such as a multicore cable, an opto-electronic communication line, etc., or a non-physical connection, such as a wireless connection, e.g., a radio link, microwave link, etc.

An electronic control arrangement refers, for example, to an arrangement including only one electronic control arrangement or a number of connected electronic control arrangements. The electronic control arrangement(s) may be arranged to perform the steps according to the method described herein.

The terminology used herein is for the purpose of describing particular aspects hereof only and is not intended to be limiting. Moreover, the singular forms "a," "an," and "the" are intended to include the plural forms as well, unless the context clearly indicates otherwise.

In some implementations and according to some aspects hereof, the functions or steps noted in the blocks can occur out of the order noted in the operational illustrations. For example, two blocks shown in succession may, for example, be executed substantially concurrently or the blocks can sometimes be executed in the reverse order, depending upon the functionality and/or acts involved. Also, the functions or steps noted in the blocks may, for example, according to some aspects hereof be executed continuously in a loop.

It should further be noted that any reference sign character does not limit the scope hereof, that the example embodiments may be implemented at least in part by hardware and/or software, and that several arrangements, units, or devices may be represented by the same item of hardware, etc.

Figure 2:
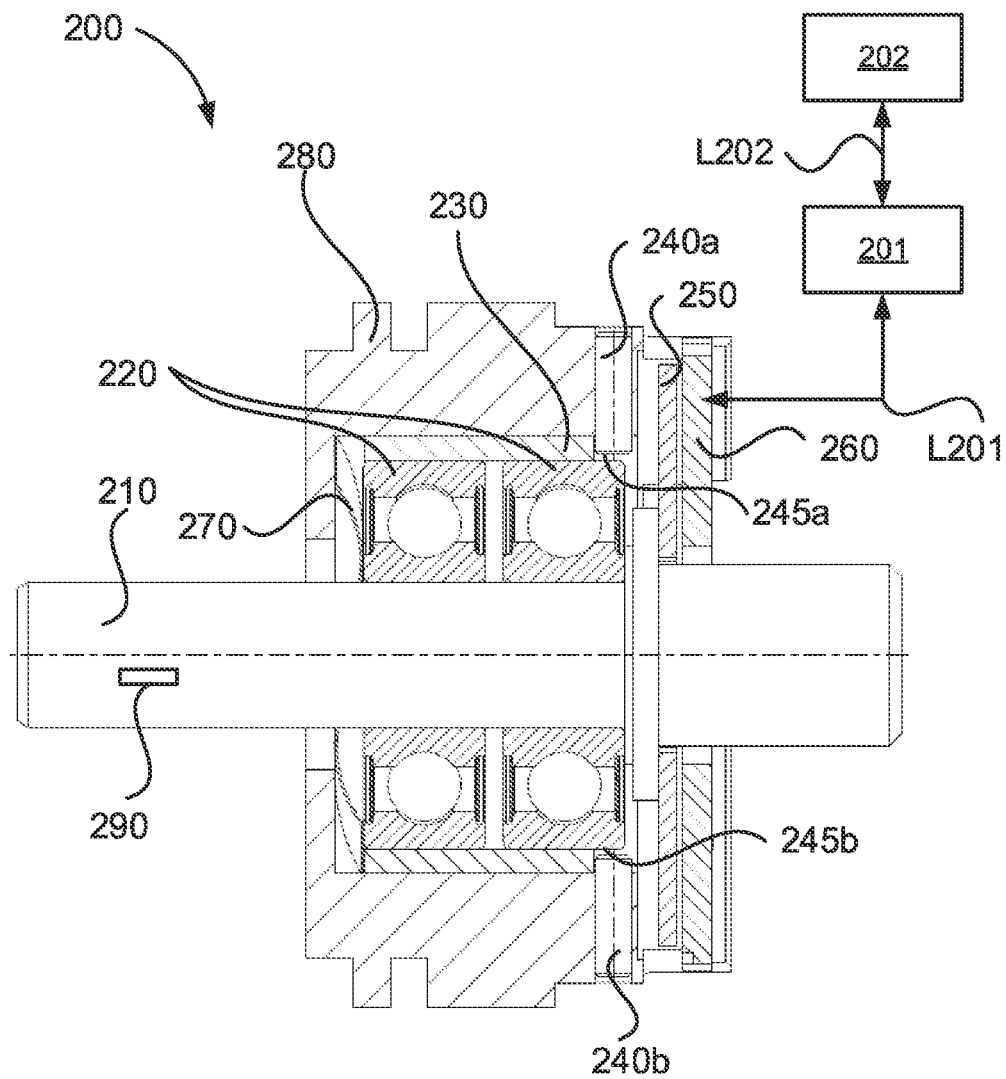
FIG. 2 schematically illustrates a rotary encoder according to an example embodiment of the present invention.

FIG. 2 schematically illustrates a rotary encoder 200 according to an example embodiment of the present invention. The rotary encoder 200 includes a shaft 210 configured to be attached to a rotating device of an assembly, such as the assembly 100 illustrated in greater detail with reference to FIG. 1. The rotary encoder is arranged to determine values of a set of operational parameters of the shaft 210. The operational parameters may be characteristics of operation of the assembly 100. For example, the set of operational parameters may include the parameter corresponding to the prevailing angular position of the shaft 210. For example, the set of operational parameters may include any of the parameters: prevailing angular position of the shaft 210 and rotational speed of the shaft 210.

The shaft 210 may, for example, be connectable to a rotating device of the assembly by a recess 290. This allows a connection in a rotatable fixed manner. Alternatively, the shaft 210 may be connectable to a rotating device of the assembly by a suitable fastening device. For example, a connection between the shaft 210 and a rotating device of the assembly is performed via a shaft coupling device. A connection between the shaft 210 and a rotating device of the assembly is performed, for example, via a clutch. This allows a releasable connection. The connection between the shaft 210 and the rotating device of the assembly allows movement of a package including the bearing configuration 220, the bushing 230, the shaft 210, and the rotor 250.

A bearing configuration 220 is fixedly arranged to the shaft 210. The bearing configuration 220 may include suitable bearings. For example, the bearing configuration 220 includes a set of two rolling-element bearings. At least two rolling-element bearings may be provided for achieving a balanced and low-vibration operation of the rotary encoder 200.

An axial bushing 230 is internally connected to the bearing configuration 220. The bearing configuration 220 is fixedly arranged to the interior of the bushing 230. The bushing 230 is rotatably arranged in a housing 280 of the rotary encoder 200. Thus, an outer surface of the bushing 230 is not fixedly secured to the housing 280. The axial bushing 230 may provide a cylindrical form. The bushing 230 may be formed of any suitable material, such as a metal, alloy, e.g., copper, stainless steel, etc. The housing 280 may be formed of any suitable material, such as a metal, alloy, plastic material, etc.

A spring member 270 is arranged to pre-stress a package including the bushing 230, the bearing configuration 220, the shaft 210, and the rotor 250 in a direction towards the stator 260. This direction is referred to as a first axial direction. The spring member 270 may be any suitable spring element. For example, the spring member is arranged as a wave spring. The wave spring may include a coiled flat wire with waves. The wave spring may be a single turn wave spring. The wave spring may be a multi turn wave spring. The spring member 270 may according to one example be a coil spring. For example, the spring member 270 may include a number of spring elements being arranged to pre-stress the package including the bearing configuration 220 and the bushing 230 in the first axial direction of the shaft 210.

The bushing 230 includes at least one recess. The bushing 230 may include a first recess 245a and a second recess 245b arranged, for example, diametrically opposite to each other. This provides, for example, a more balanced operation of the rotary encoder 200. Any suitable number of recesses may be provided to the bushing 230. For example, the recesses are evenly distributed at the bushing 230. Each recess of the bushing 230 is provided at a first end of the bushing 230 facing the rotor 250. The bushing 230 has a second end facing the spring member 270. Each recess provides a profile having an extension in an axial direction of the bushing 230. Each recess provides a profile having an extension in a circumferential direction of the bushing 230.

Each of the provided recesses of the bushing 230 is arranged to receive a respective pin. Alternatively, any suitable structure, such as a screw, elongated member, protrusion, etc., may be arranged for forcing the bushing 230 when the bushing rotates towards the spring member 270. The first recess 245a is arranged, for example, to receive a first pin 240a, and the second recess 245a is arranged, for example, to receive a second pin 240b. The first pin 240a and the second pin 240b are arranged such that they cause an axial movement of the bushing 230 and the bearing configuration 220 when they leave the respective recess when the bushing 230 is forced into rotation due to malfunction of the bearing configuration 220. The first pin 240a and the second pin 240b are therefore in contact with respective portions of the housing 280. Thus, the pins are arranged to push and/or move a package including the bearing configuration 220 and the bushing in an axial direction towards the spring member 270. Thus, a displacement between the rotor 250 and stator 260 is achieved, which displacement is, for example, sufficient for interrupting detection of angular positions of the shaft 210 and/or rotor 250 provided by the rotary encoder 200. A displacement between the rotor 250 and stator 260 is therefore achieved, which displacement is, for example, sufficient for reducing detectability of angular positions of the shaft 210 and/or rotor 250 provided by the rotary encoder 200 to a level below a predetermined threshold.

The profiles of the recesses and the respective pins are arranged according to a method of detection of the rotary encoder 200, e.g., optical detection method or inductive detection method. Thus, a displacement of the bushing 230 and the bearing configuration 220 together with the rotor 250 and the shaft 210 is predetermined and adapted to the detection method of the rotary encoder. A required displacement for signal interruption between the rotor 250 and the stator 260 of the rotary encoder 200 may be empirically determined.

The rotary encoder 200 works by being configured to detect relative rotation of the rotor 250 and the stator 260. The rotation of the rotor 250 with respect to the stator 260 may be detected using any technology capable of detecting such changes. Examples of such technologies include capacitive, optical, inductive, magnetic detection, etc. The rotary encoder 200 may be configured as an incremental and/or an absolute rotary encoder. Rotor and stator refer, for example, to single components as well as aggregates serving a common function of rotor or stator.

The rotor 250 further include a first disc having a scale for detection of relative rotation between the rotor 250 and the stator 260. The first disc is mounted at the shaft 210. When the shaft 210 rotates with respect to the stator 260, rotation measurement circuitry at the stator 260 can detect changes in the scale with respect to the rotation measurement circuitry. For example, the scale may include inductive, capacitive, and/or magnetic elements, etc., configured to cause a corresponding inductive, capacitive, or magnetic signal when the first disc is rotated with respect to the stator 260. The scale may be part of an optical rotary encoder, in which the rotary encoder is configured to shine a light onto a photodiode through slits in the first disc. Alternatively, a reflective version of an optical rotation measurement technology for an optical rotary encoder may be used. Alternatively, any suitable components being arranged for detecting operational parameters may be used in the rotary encoder

200. The components are chosen on the basis of the operation parameter detection method of the rotary encoder 200.

The stator 260 includes a second disc. The second disc includes measurement apparatus configured to detect relative motion of the first and second discs, e.g., by detecting the inductive, capacitive, or magnetic signals, etc. The second disc may be a printed circuit board.

The stator 260 is, for example, not disc-shaped and may be referred to as a scanner or scanning unit.

A first control arrangement 201 is arranged for communication with the rotary encoder 200 via a link L201. The first control arrangement 201 may be arranged for communication with the rotation measurement circuitry at the stator 260 via the link L201. Thus, the stator 260 is arranged to send signals including information about operational parameters to the first control arrangement 201 via the link L201.

The first control arrangement 201 is arranged to determine values of the operational parameters. The first control arrangement 201 is arranged for presenting determined values of the operational parameters via a suitable presentation or display device to an operator of the assembly 100 and/or the rotary encoder 200. The first control arrangement 201 is arranged to determine if detection of operational parameters is interrupted. The control arrangement 201 may be arranged to determine if detection of operational parameters is interrupted due to a displacement between the rotor 250 and the stator 260 caused by malfunctioning of the bearing configuration 220.

The first control arrangement 201 may be arranged to generate an alarm signal when an interrupted detection of angular positions of the shaft 210 and/or rotor 250, as detected by the rotary encoder 200, is at hand. Thus, the first control arrangement 201 is arranged to provide the alarm signal to a device, such as the presentation device, being arranged to indicate malfunctioning of the bearing configuration 220 to an operator.

The first control arrangement 201 may be arranged to automatically interrupt operation of the assembly 100 connected to rotary encoder 200 when an interrupted detection of angular positions of the shaft 210 and/or rotor 250, as detected by the rotary encoder 200, is at hand.

An operator of the assembly 100 and/or the rotary encoder 200 may, where applicable, re-start operation of the assembly 100 manually. This may be performed by the first control arrangement 201 and/or the second control arrangement 202 via a suitable user-interface.

A re-start operation of the assembly 100 may, where applicable, be performed automatically. Thus, a hold circuit may be provided to, e.g., the rotation measurement circuitry at the stator 260.

Detection of operational parameters may be automatically resumed after signal interruption where applicable.

A second control arrangement 202 is arranged for communication with the first control arrangement 201 via a link L202. It may be releasably connected to the first control arrangement 201. It may be a control arrangement external to the assembly 100. It may be adapted to perform the steps described herein. It may be used to cross-load software to the first control arrangement 201, particularly software for applying the method described herein. It may alternatively be arranged for communication with the first control arrangement 201 via an internal network of the assembly 100. It may be adapted to performing functions corresponding to those of the first control arrangement 201, such as generating an alarm signal when an interrupted detection of angular positions of the shaft 210 and/or rotor 250, as detected by the rotary encoder 200, is at hand, and/or when a detectability of angular positions of the shaft 210 and/or rotor 250, as detected by the rotary encoder 100, is reduced to a level below a predetermined threshold. The second control arrangement 202 may be arranged for operating the assembly 100. For example, the second control arrangement 202 may be arranged to control operation of the motor 120 and the clutch 140 of the assembly 100.

The rotary encoder 200 may be arranged to be connected to an assembly 100 for detecting operational parameters thereof. A set including the rotary encoder 200 and the first control arrangement 201 may be arranged to be connected to an assembly including the second control arrangement 202, in which the second control arrangement 202 is a control arrangement being external to the rotary encoder 200. The set including the rotary encoder 200 and the first control arrangement 201 may thus be arranged for being plugged-in to an assembly 100 where operational parameters are to be detected for various purposes.

The rotation measurement circuitry at the stator 260 may be arranged to perform the same functions as the first control arrangement 201 and the second control arrangement 202. Method steps described herein may thus be performed by any of the rotation measurement circuitry at the stator 260, the first control arrangement 201, and the second control arrangement 202.

A connection member 290 is arranged at the shaft 210. The connection member 290 may be integrally formed with the shaft 210. The connection member 290 may include one or more recesses. This is schematically illustrated in FIG. 2. The connection member may be formed as one or more protrusions. The connection member 290 is arranged for fixing the shaft 210 to a shaft of an assembly 100. In other words, the connection member 290 is configured to fixedly secure the shaft 210 to a shaft being external to the rotary encoder 200.

A holding device of the shaft external to the rotary encoder 200 may be arranged for interacting with the at least one recess of the shaft 210 so as to achieve a fixedly secured connection between the two shafts. A holding device of the shaft external to the rotary encoder 200 may be arranged for interacting with the at least one protrusion of the shaft 210 so as to achieve a fixedly secured connection between the two shafts. The device for connecting the external shaft and the shaft 210 may be referred to as a coupling.

It should be noted that a package including the bearing configuration 220, the bushing 230, the shaft 210, and the rotor 250 is arranged to be displaced in the second axial direction. The package is arranged to be moved such that a distance between the rotor 250 and the stator 260 is increased from a first distance d1 to a second distance d2 (see FIG. 3*b*). Thus, the connection member 290 and/or the external shaft are arranged to allow such movement of the package.

A smooth shaft 210 may be used, and the shafts may be connected by clamps. The shaft 210 may include a hollow shaft for allowing reception of an external shaft.

A suitable locking device may be provided for fixedly securing the shaft 210 to the shaft being external to the rotary encoder 200.

The connection member 290 may be configured to releasably secure the shaft 210 to the shaft being external to the rotary encoder 200.

The rotary encoder 200 may further be configured for electromagnetic compatibility scenarios. The housing 280 of the rotary encoder 200 may be arranged to fix and protect fragile EMC components from vibrations. According to some aspects, the rotary encoder 200 further includes electrostatic discharge, ESD, shielding arranged to shield the rotary encoder 200 from electrostatic charge and/or discharge. According to some aspects, the rotary encoder 200 further includes electromagnetic shielding arranged to prevent electromagnetic radiation to and/or from the rotary encoder 200 exceeding a predetermined threshold. According to some aspects, the rotary encoder 200 is configured to function without degradation in the presence of a predetermined electromagnetic disturbance. In other words, according to some aspects, the rotary encoder 200 is configured to be electromagnetically immune to a predetermined radio frequency interference.

According to some aspects, the rotary encoder 200 may further include a set of sealing components arranged at the rotary encoder 200. The set of sealing components is arranged to seal the rotary encoder 200 from an environment.

According to some aspects, the rotary encoder 200 includes a set of sealing components. The set of sealing components is arranged to seal the rotary encoder 200 from an environment.

According to some aspects, the rotary encoder 200 includes a set of spacers. The set of spacers is configured to fix a relative position between two or more components of the rotary encoder 200.

Figure 3A:
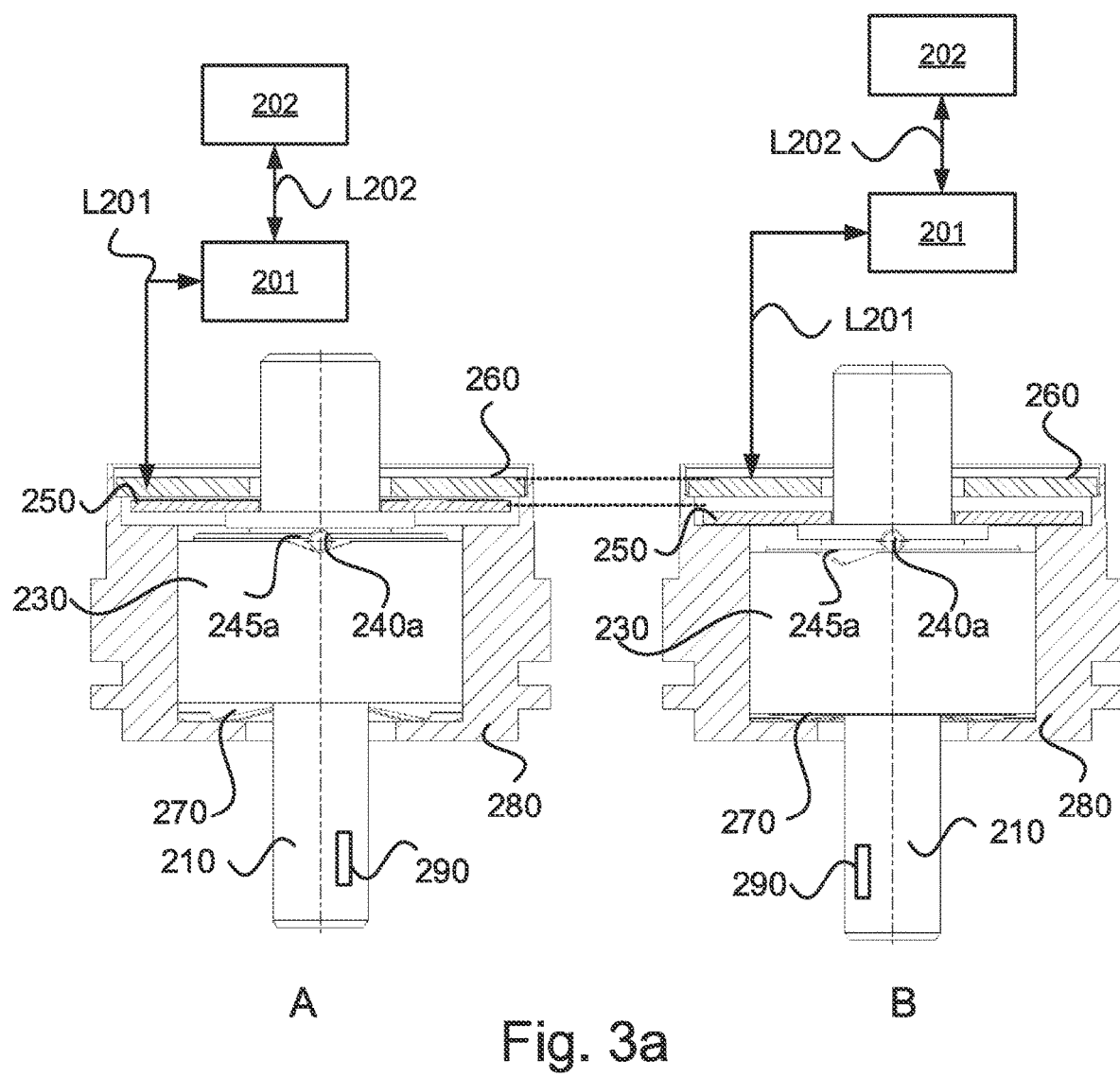
FIG. 3a schematically illustrates two different states of a rotary encoder according to an example embodiment of the present invention.

It should be noted that many different versions of the distancing arrangement may be implemented. The distancing arrangement may provide an inverted structure, compared to that described above, in which the recesses as described with reference to FIG. 2 and FIG. 3a are replaced with protrusions and the pins are replaced with a counterpart with a recess. According to this arrangement, the bushing 230 is provided with a number of protrusions, and the housing is provided with corresponding recesses, each of the recesses being arranged to receive a respective protrusion. The function of such a configuration is similar to the function of the configuration described with reference to FIG. 2 and FIG. 3a, e.g., that the bushing 230 and the bearing configuration 220 together with the rotor 250 are displaced in the second axial direction by rotation of the bushing 230 resulting from malfunction of the bearing configuration 220 and by creating increased distance between the rotor 250 and stator 260 caused by the distancing arrangement. The increased distance between the rotor 250 and the stator 260 is sufficient to reduce detectability of angular positions of the shaft 210 and/or rotor 250, as detected by the rotary encoder 200, to a level below a predetermined threshold.

The distancing arrangement may include a number of recesses being provided on an outer surface of the bearing configuration 220, each recess being arranged to receive a protrusion of the housing 280. The distancing arrangement may include a number of protrusions being provided on an outer surface of the bearing configuration 220, each protrusion being arranged in a respective recess of the housing 280.

FIG. 3a schematically illustrates two different states of a rotary encoder 200. The rotary encoder 200 is illustrated in a cross-sectional view. Two recesses 245a, 245b are provided in the bushing 230, recess 245b being provided with a corresponding pin 240b. A first state A of the rotary encoder is illustrated to the left, and a second state B of the rotary encoder is illustrated to the right.

The first state A refers to a normal state of operation of the rotary encoder 200. A distance between the rotor 250 and the stator 260 is sufficient for normal, desired, and/or accurate detection of operational parameters of the shaft 210. Examples of such operational parameters may be relative rotational position of the shaft 210 and angular speed of the shaft 210. The distance between the rotor 250 and the stator 260 may be an optimal distance for accurate and reliable detection of operational parameters of the shaft 210.

As illustrated with reference to the rotary encoder being in the first state A, the spring member 270 is arranged to pre-stress the bushing 230 and the bearing configuration 220 in a first axial direction of the shaft 210, i.e., toward the stator 260. The pin 240a is provided in the recess 245a. The pin 240b is provided in the recess 245b.

The second state B refers to a state of operation of the rotary encoder 200 where malfunctioning of the bearing configuration 220 is at hand. A driving torque of the bearing configuration 220 is increased to certain level due to the bearing configuration 220 being blocked or becoming sluggish. A distance between the rotor 250 and the stator 260 is increased, compared to the distance according to the first operational state A, to such an extent that detection of operational parameters of the shaft 210 is interrupted. The displacement between the rotor 250 and the stator 260 is thus, not small enough for accurate and reliable detection of operational parameters of the shaft 210.

As illustrated with reference to the rotary encoder 200 being in the second state B, the spring member 270 is in a compressed state caused by movement of the bushing 230 and the bearing configuration 220 in the second axial direction of the shaft 210, i.e., away from the stator 260. The pins 240a and 240b are not provided in the recess 245a and 245b, respectively, but are affecting the bushing 230, bearing configuration 220, and the rotor 250 to move in the second axial direction, in which the second operational state B is achieved. A generated force by the dislocation of the pins overcomes a force of the spring member 270. As the pins leave the respective recess, an increased distance between the rotor 250 and stator 260 is achieved. The pins are thus forced to leave the respective recess by rotation of the bushing 230 due to malfunction of the bearing configuration 220. This new, increased, distance between the rotor 250 and the stator 260 is sufficient for interrupting detection of operational parameters of the rotor 250 and the stator 260.

The form and/or profile of the at least one recess of the bushing 230 may be any suitable form and/or profile. The dimensions of the at least one recess of the bushing 230 may be any suitable dimensions. The recesses of the bushing 230 may be V-shaped, U-shaped, concave, etc.

The form and/or profile of the pins of the rotary encoder 200 may be any suitable form and/or profile. The dimensions of the pins of the rotary encoder 200 may be any suitable dimensions. The pins of the rotary encoder 200 may have a circular cross-section area, an elliptical cross-section area, etc.

It should be noted that the form and/or profile and the dimensions of the recesses of the bushing 230 as well as the form and/or profile and the dimensions of the corresponding pins are chosen so as to cause an interruption of the detection of operational parameters by the rotor 250 and the stator 260 when the bearing configuration 220 is malfunctioning. The malfunctioning of the bearing configuration 220 may be related to bearing blockage or that the bearing configuration 220 by any reason become sluggish.

Figure 3B:
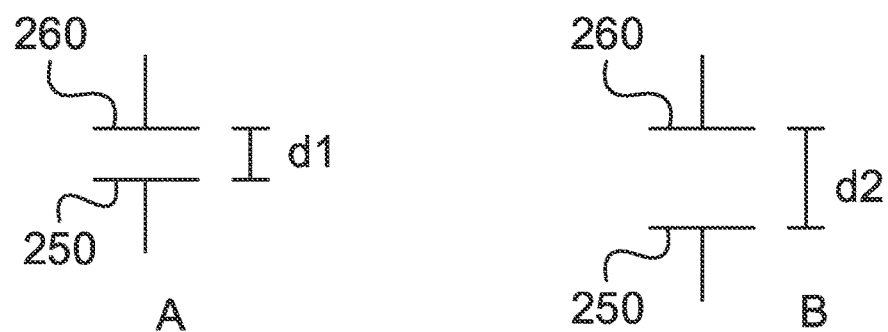
FIG. 3b schematically illustrates two different states of a rotary encoder according to an example embodiment of the present invention.

FIG. 3b schematically illustrates distances between the rotor 250 and the stator 260 in the first operational state A and the second operational state B.

In the first operational state A, the rotor 250 and the stator 260 are separated by a distance d1. The distance d1 is a predetermined distance, which allows proper detection of operational parameters of the shaft 210.

In the second operational state B, the rotor 250 and the stator 260 are separated by a distance d2. The distance d2 is a predetermined distance, which does not allow proper detection of operational parameters of the shaft 210. In the second operational state B, reduced detectability of angular positions of the shaft 210 and/or rotor 250 to a level below a predetermined threshold is at hand. In the second operational state B, completely interrupted detection of angular positions of the shaft 210 and/or rotor 250 may be at hand.

The distance d2 is greater than the distance d1.

Figure 4A:
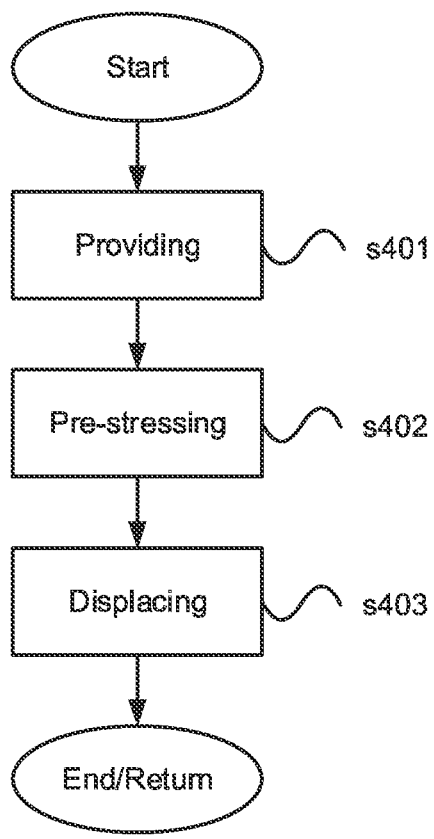
FIG. 4a is a flowchart that schematically illustrates a method according to an example embodiment of the present invention.

FIG. 4a is a flow chart that schematically illustrates a method for determining malfunction of a rotary encoder 200, the rotary encoder 200 including a rotor 250, a stator 260, and a shaft 210 having a bearing configuration 220. A method step s401 includes providing an axial bushing 230 internally connected to the bearing configuration 220 and rotatably arranged in a housing 280 of the rotary encoder, the rotary encoder including a distancing arrangement being arranged to change an axial distance between the rotor 250 and the stator 260.

A method step s402 includes pre-stressing the bushing 230 and the bearing configuration 220 in a first axial direction by a spring member 270.

A method step s403 includes displacing the bushing 230 and the bearing configuration 220 together with the rotor 250 in a second axial direction, opposite to the first axial direction, by rotation of the bushing 230 resulting from malfunction of the bearing configuration 220 and by creating increased distance between the rotor 250 and stator 260 caused by the distancing arrangement, which increased distance is sufficient to reduce detectability of angular positions of the shaft 210, as detected by the rotary encoder 100, to a level below a predetermined threshold.

The detectability may relate to amplitudes of measured angular position signals. The predetermined threshold may be any suitable threshold, e.g., 90%, 80%, 50%, etc., of average amplitude of measured angular position signals of a certain predetermined time interval. The predetermined time interval may be any suitable time interval, e.g., 1 second, 5 seconds, etc. The predetermined time interval may be less than 1 second. The predetermined time interval may be larger than 5 seconds.

The detectability may relate to frequency of actually detected angular positions during a predetermined time interval. The predetermined threshold may be any suitable threshold, e.g., 90%, 80%, 50%, etc., of detection frequency of normal and/or correct detection frequency during a predetermined time interval. The predetermined time interval may be any suitable time interval, e.g., 1 second, 5 seconds, etc. The predetermined time interval may be less than 1 second. The predetermined time interval may be larger than 5 seconds.

After the method step s403, the method ends and/or is returned.

Figure 4B:
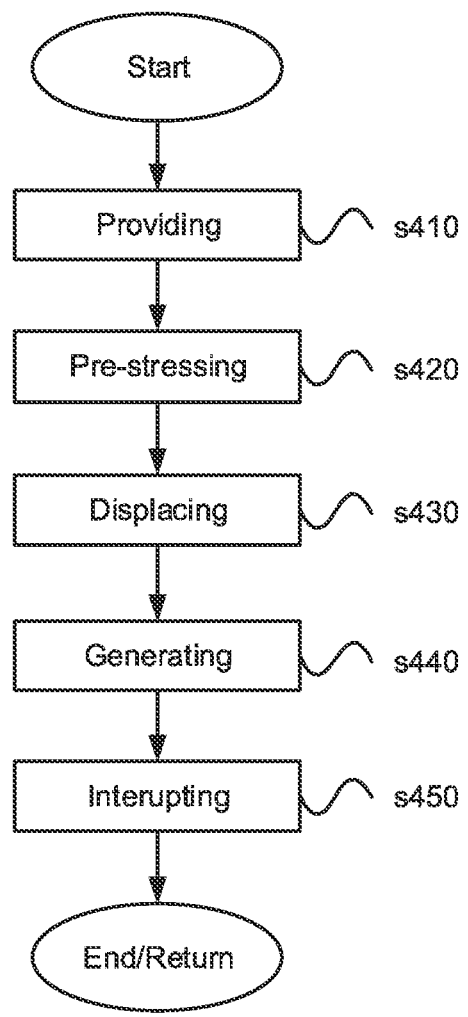
FIG. 4b is a flowchart that schematically illustrates a method according to an example embodiment of the present invention.

FIG. 4b is a flow chart that schematically illustrates a method for determining malfunction of a rotary encoder 200, the rotary encoder 200 including a rotor 250, a stator 260, and a shaft 210 having a bearing configuration 220.

Method step s410 includes providing an axial bushing 230 internally connected to the bearing configuration 220 and rotatably arranged in a housing 280 of the rotary encoder 200, the bushing 230 including at least one recess, each being arranged to receive a respective pin. The at least one recess is formed to have a depth in an axial direction of the bushing 230. Thus, the at least one recess is arranged to receive a respective pin in an orthogonal direction of the axial direction of the bushing 230. The step s410 may include providing more than one recesses to the bushing 230, each of the recesses being arranged to receive a respective pin. After the method step s410, a subsequent method step s420 may be performed.

The method step s420 may include pre-stressing the bushing 230 and the bearing configuration 220 in a first axial direction by a spring member 270. The acting force of the spring member 270 may be chosen on the basis of characteristics of the rotary encoder 200, such as configuration parameters of the recesses and the respective pins.

After the method step s420, a subsequent method step s430 may be performed.

The method step s430 may include displacing the bushing 230 and the bearing configuration 220 together with the rotor 250 in a second axial direction, opposite to the first axial direction, by rotation of the bushing 230 due to malfunction of the bearing configuration 220 such that the pins leave the respective recess and thus causing a displacement between the rotor 250 and stator 260 sufficient to interrupt detection of angular positions of the shaft 210 provided by the rotary encoder 200. Thus, a reliable interruption of the detection provided by the rotary encoder 200. Rotation of the bushing is introduced in a mechanical manner when the bearing configuration 220 is malfunctioning. An increased displacement between the rotor 250 and the stator 260 is introduced at an early stage of malfunction which may reduce implications. The method step s430 may include displacing the bushing 230 and the bearing configuration 220 together with the rotor 250 in the second axial direction a distance adapted to a detection method of the rotary encoder 200. By configuring the recesses and the respective pins, an adequate interruption of the detection of operational parameters is provided. After the method step s430, a subsequent method step s440 may be performed.

The method step s440 may include generating an alarm signal when an interrupted detection of the rotary encoder 200 is at hand. Thus, an operator at an early stage may be informed about that the bearing configuration 220 is malfunctioning. The operator may manually interrupt operation of the encoder 200 and/or operation of the assembly 100, e.g., by controlling the engine 120 to stop or by controlling a clutch 140 of the assembly 100 to disengage and reduce provided torque from the engine 120. After the method step s440, a subsequent method step s450 may be performed.

The method step s450 may include automatically interrupting operation of an assembly 100 connected to the rotary encoder 200. This may be performed by the first control arrangement 201, the second control arrangement 202, or the rotation measurement circuitry of the stator 260. Thus, a control arrangement may be arranged to automatically control the engine 120 to stop or to control a clutch 140 of the assembly 100 to disengage and reduce provided torque from the engine 120. A brake unit of the assembly may be operated so as to reduce rotation velocity of the shaft of the assembly 100 and/or the shaft 210 of the rotary encoder. This may be performed by the first control arrangement 201, the second control arrangement 202, or the rotation measurement circuitry of the stator 260.

Interrupted operation of the assembly 100 connected to the rotary encoder 200 may be performed by switching the power off, thus shutting down the assembly at least partly. This may be performed by the first control arrangement 201, the second control arrangement 202, or the rotation measurement circuitry of the stator 260.

After the method step s450 the method ends.

Figure 5:
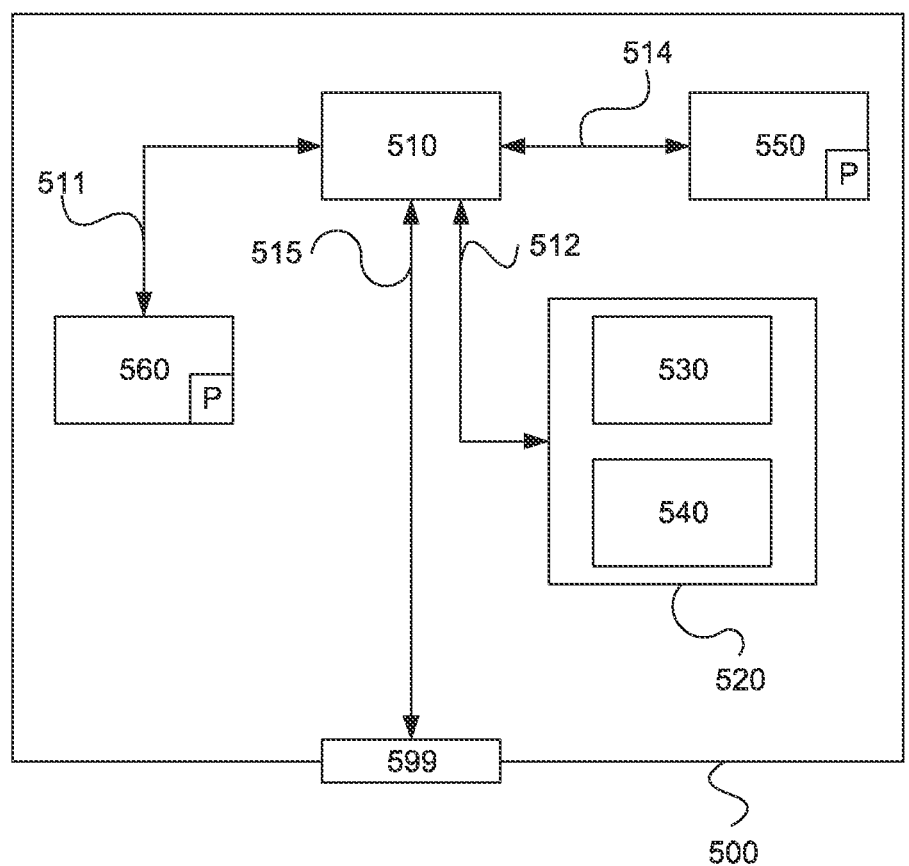
FIG. 5 schematically illustrates a computer according to an example embodiment of the present invention.

FIG. 5 schematically illustrates a device 500. The control arrangements 201 and 202 described with reference to FIG. 2 and FIG. 3a may include the device 500. The rotation measurement circuitry of the stator 260 may include the device 500. The device 500 includes a non-volatile memory 520, a data processing unit 510, and a read/write memory 550. The non-volatile memory 520 has a first memory element 530 in which a computer program, e.g., an operating system, is stored for controlling the function of the device 500. The device 500 further includes a bus controller, a serial communication port, I/O device(s), an A/D converter, a time and date input and transfer unit, an event counter, and an interruption controller. The non-volatile memory 520 also has a second memory element 540.

A computer program includes routines for determining malfunction of a rotary encoder 200, the rotary encoder including a rotor 250, a stator 260, and a shaft 210 having a bearing configuration 220.

The computer program P may include routines for detecting reduced detectability of angular positions of the shaft 210, as detected by the rotary encoder 100, to a level below a predetermined threshold.

The computer program P may include routines for detecting an interruption of detection of angular positions of the shaft 210, provided by the rotary encoder 200, due to an increased distance between the rotor 250 and the stator 260 caused by malfunction of the bearing configuration 220.

The computer program P may include routines for generating an alarm signal when a reduced detectability of angular positions of the shaft 210, as detected by the rotary encoder 100, to a level below a predetermined threshold, is at hand.

The computer program P may include routines for automatically interrupting operation of an assembly 100 connected to the rotary encoder 200 when a reduced detectability of angular positions of the shaft 210, as detected by the rotary encoder 100, to a level below a predetermined threshold, is at hand.

The computer program P may include routines for generating an alarm signal when an interrupted detection of angular positions of the shaft 210, provided by the rotary encoder 200, is at hand. The computer program P may include routines for automatically interrupting operation of an assembly 100 connected to rotary encoder 200 when an interrupted detection of angular positions of the shaft 210, provided by the rotary encoder 200, is at hand.

The computer program P may include routines for performing any of the process steps described herein.

The program P may be stored in an executable form or in compressed form in a memory 560 and/or in a read/write memory 550, e.g., a non-transitory computer-readable storage medium.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L201, L202, and L120, for example, may be connected to the data port 599 (see FIGS. 1, 2, and 3a).

When data are received on the data port 599, they are stored in the second memory element 540. When input data received have been stored, the data processing unit 510 will be prepared to conduct code execution as described above.

Parts of the methods herein described may be conducted by the device 500 by the data processing unit 510 which executes the program stored in the memory 560 or the read/write memory 550. When the device 500 executes the program, method steps and process steps herein described are executed.

The relevant method steps described herein may be performed by, e.g., the device 500. Any suitable processing circuitry may be used for performing the disclosed method steps. The processing circuitry may be arranged in the rotary encoder 200 or externally of the rotary encoder 200, such as at the assembly 100.

The computer program product includes a computer readable medium such as, for example a universal serial bus (USB) memory, a plug-in card, an embedded drive, a read only memory (ROM), etc. The computer readable medium has stored thereon a computer program including program instructions. The computer program is loadable into the processing circuitry arranged in any of the first control arrangement 201, second control arrangement 202, or the rotation measurement circuitry of the stator 260. When loaded into the processing circuitry, the computer program may be stored in a memory associated with or arranged in the processing circuitry and executed by a processor. The computer program may, when loaded into and executed by the processing circuitry, cause execution of method steps according to, for example, the methods illustrated in FIGS. 4a and 4b or otherwise described herein.

A computer program product may include instructions which, when the program is executed by a computer, e.g., the first control arrangement 201 and/or the second control arrangement 202, cause the computer to perform the step of detecting a reduced detectability of angular positions of the shaft 210, as detected by a rotary encoder 200, to a level below a predetermined threshold due to an increased distance between a rotor 250 and stator 260 caused by malfunction of the bearing configuration 220.

A computer-readable storage medium may include instructions which, when executed by a computer, e.g., the first control arrangement 201 and/or the second control arrangement 202, cause the computer to perform the step of detecting a reduced detectability of angular positions of a shaft 210, as detected by a rotary encoder 200, to a level below a predetermined threshold due to an increased distance between a rotor 250 and stator 260 caused by malfunction of a bearing configuration 220.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided example embodiments. The examples discussed herein were chosen and described in order to explain the principles and the nature of various example embodiments and its practical application. The features of the example embodiments described herein may be combined in all possible combinations of methods, apparatus, modules, systems, and computer program products. It should be appreciated that the example embodiments presented herein may be practiced in any combination with each other.

The drawings and the above description provide explanations of exemplary embodiments. However, many variations and modifications can be made to these example embodiments. Accordingly, although specific terms are employed, they are used in a generic and descriptive sense only and not for purposes of limitation.

What is claimed is:

1. A method for determining malfunction of a rotary encoder that includes a rotor, a stator, a shaft having a bearing configuration, an axial bushing internally connected to the bearing configuration and rotatably arranged in a housing of the rotary encoder, and a distancing device adapted to change an axial distance between the rotor and the stator, comprising:
   pre-stressing the bushing and the bearing configuration in a first axial direction by a spring member; and
   displacing the bushing and the bearing configuration together with the rotor in a second axial direction, opposite to the first axial direction, by rotation of the bushing resulting from malfunction of the bearing configuration and by creating increased distance between the rotor and the stator caused by the distancing device, the increased distance being sufficient to reduce detectability of angular positions of the shaft, as detected by the rotary encoder, to a level below a predetermined threshold.

2. The method according to claim 1, further comprising displacing the bushing and the bearing configuration together with the rotor in the second axial direction a distance adapted to a detection method of the rotary encoder.

3. The method according to claim 1, further comprising generating an alarm signal in response to the reduced detectability of the angular positions of the shaft, as detected by the rotary encoder, to the level below the predetermined threshold.

4. The method according to claim 1, further comprising automatically interrupting operation of an assembly connected to the rotary encoder in response to the reduced detectability of the angular positions of the shaft, as detected by the rotary encoder, to the level below the predetermined threshold.

5. The method according to claim 1, further comprising generating an alarm signal in response to an interrupted detection of the angular positions of the shaft and/or the rotor, as detected by the rotary encoder.

6. The method according to claim 1, further comprising automatically interrupting operation of an assembly connected to the rotary encoder in response to an interrupted detection of the angular positions of the shaft and/or the rotor, as detected by the rotary encoder.

7. The method according to claim 1, wherein the bushing includes at least one recess, each recess being adapted to receive a respective pin.

8. A rotary encoder, comprising:
   a rotor;
   a stator;
   a shaft having a bearing configuration;
   an axial bushing internally connected to the bearing configuration and rotatably arranged in a housing of the rotary encoder;
   a spring device adapted to pre-stress the bushing and the bearing configuration in a first axial direction; and
   a distancing device adapted to change an axial distance between the rotor and the stator;
   wherein the bushing and the bearing configuration together with the rotor are displaceable in a second axial direction, opposite to the first axial direction, by rotation of the bushing resulting from malfunctioning of the bearing configuration and by creating increased distance between the rotor and stator, the increased distance being sufficient to reduce detectability of angular positions of the shaft, as detected by the rotary encoder, to a level below a predetermined threshold.

9. The rotary encoder according to claim 8, further comprising a displacement device adapted to displace the bushing and the bearing configuration together with the rotor in the second axial direction a distance adapted to a detection method of the rotary encoder.

10. The rotary encoder according to claim 8, further comprising an alarm device adapted to generate an alarm signal in response to the reduced detectability of the angular positions of the shaft, as detected by the rotary encoder, to the level below the predetermined threshold.

11. The rotary encoder according to claim 8, further comprising an automatic interruption device adapted to automatically interrupt operation of an assembly connected to the rotary encoder in response to the reduced detectability of the angular positions of the shaft, as detected by the rotary encoder, to the level below the predetermined threshold.

12. The rotary encoder according to claim 8, further comprising an alarm device adapted to generate an alarm signal in response to an interrupted detection of the angular positions of the shaft, as detected by the rotary encoder.

13. The rotary encoder according to claim 8, further comprising an automatic interruption device adapted to automatically interrupt operation of an assembly connected to the rotary encoder in response to an interrupted detection of the angular positions of the shaft, as detected by the rotary encoder.

14. The rotary encoder according to claim 8, wherein the bushing includes a plurality of recesses, each recess being adapted to receive a respective pin.

15. A non-transitory computer-readable storage medium storing a set of instructions that, when executed by a processor, cause the processor to detect a reduced detectability of angular positions of a shaft, as detected by a rotary encoder, to a level below a predetermined threshold due to an increased distance between a rotor of the rotary encoder and stator of the rotary encoder caused by malfunction of a bearing configuration of the rotary encoder.

* * * * *